United States Patent [19]
Dwork et al.

[11] Patent Number: 5,978,482
[45] Date of Patent: *Nov. 2, 1999

[54] METHOD AND SYSTEM FOR PROTECTION OF DIGITAL INFORMATION

[75] Inventors: Cynthia Dwork, Palo Alto; Joseph Y. Halpern, Cupertino; Jeffrey Bruce Lotspiech, San Jose, all of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/517,539

[22] Filed: Aug. 21, 1995

[51] Int. Cl.$^6$ .............................. H04L 9/00; H04K 1/00

[52] U.S. Cl. ................... 380/21; 380/25; 380/49

[58] Field of Search .................. 380/4, 25, 49, 380/23, 21

[56] References Cited

U.S. PATENT DOCUMENTS

| | | | |
|---|---|---|---|
| 4,405,829 | 9/1983 | Rivest et al. | 178/22.1 |
| 4,827,508 | 5/1989 | Shear | 380/4 |
| 4,956,863 | 9/1990 | Goss | 380/30 |
| 4,977,594 | 12/1990 | Shear | 380/4 |
| 5,050,213 | 9/1991 | Shear | 380/25 |
| 5,319,705 | 6/1994 | Halter et al. | 380/4 |
| 5,388,211 | 2/1995 | Hornbuckle | 395/200 |
| 5,400,403 | 3/1995 | Fahn et al. | 380/21 |
| 5,457,746 | 10/1995 | Dolphin | 380/4 |
| 5,483,598 | 1/1996 | Kaufman et al. | 380/43 |
| 5,586,186 | 12/1996 | Yuval et al. | 380/30 |
| 5,761,305 | 6/1998 | Vanstone et al. | 380/21 |
| 5,889,865 | 3/1999 | Vanstone et al. | 380/25 |

FOREIGN PATENT DOCUMENTS

| | | | |
|---|---|---|---|
| 639907A1 | 8/1993 | European Pat. Off. | H04L 9/32 |

OTHER PUBLICATIONS

Menezes et al, "Handbook of Applied Cryptography," ©1996 pp. 376–378, 715, and 723.

Menezes et al, "Handbook of Applied Cryptography" ©1996 pp. 506–524.

Boyd & Collin, "Design & Analysis of Key Exchange Protocols via . . . ," Advances in Crypto Asiacryp '94, pp. 171–181.

Horster et al, "Meta–el Gamal Signature Schemes," ACM 1994 pp. 96–107.

(List continued on next page.)

*Primary Examiner*—Gail O. Hayes
*Assistant Examiner*—Hrayr A. Sayadian
*Attorney, Agent, or Firm*—Gray Cary Ware Freidenrich

[57] ABSTRACT

An information processing system including an encryption processing logic module and a decryption processing logic module for enabling the encryption of digital information to be decrypted with a decryption key K. The encryption processing module includes logic for encrypting the digital information, distributing the digital information and authorizing a user to decrypt the information. The decryption processing module includes logic for the user to communicate a user number $n_i$ to receive an authorization number $a_i$ ($a_i$ being calculated as equal to $((K \oplus n_i)$ raised to the power of $(1/n_i' \bmod \phi$ from the authorization logic in the encryption processing module and extrication logic for extricating the decryption key. The user number $n_i$ uniquely identifies, and is valuable to, the user, so valuable in fact that the user would be unwilling to publically disclose it. The extrication logic operates on a digital signet pair $(a_i, n_i)$ consisting of the authorization number and user number, to extract K (K being calculated as equal to $((a_i$ raised to the power of $n_i')$ mod $N \oplus n_i)$). The decryption logic then uses K to make the content available to the user. The extrication function is fully available to the user as a publicly-computable function in which it is computationally infeasible to use the extrication function to determine other valid digital signet pairs which can be used to extract K.

13 Claims, 4 Drawing Sheets

OTHER PUBLICATIONS

Nyberg & Rueppel, "Message Recovery . . . ," Advances in Eurocrypt '94 pp. 182–193.

Horster et al, "Meta–Message Recovery . . . ," Advances in Cryptology—Asiacrypt '94 pp. 224–237.

Diffie et al, "Authentication & Authenticated Key Exchanges," Designs, Codes, and Cryptography, v2, 1992, pp. 107–125.

Matsumoto et al, "On Seeking Smart Public–Key–Distribution . . . ," Trans. of the IECE of Japan, vol. E69 (1986) pp. 99–106.

M. Robshaw, Arcade An RSA Laboratories Seminar, 1994 RSA Data Security Conference, Jan., 1994, pp. 1–30.

Esther Dyson, "Intellectual Value", from *Wired* magazine, Jul. 1995, pp. 137–141, 182–184.

"The Arcade Project: A Progress Report", from *Ciphertext, The RSA Newsletter,* vol. 2, No. 1, Summer 1994, pp. 6–7.

Benny Chor et al., "Tracing Traitors", from *Advances in Cryptology—Crypto '94,* 14th Annual International Conference, Springer–Verlag, pp. 257–270.

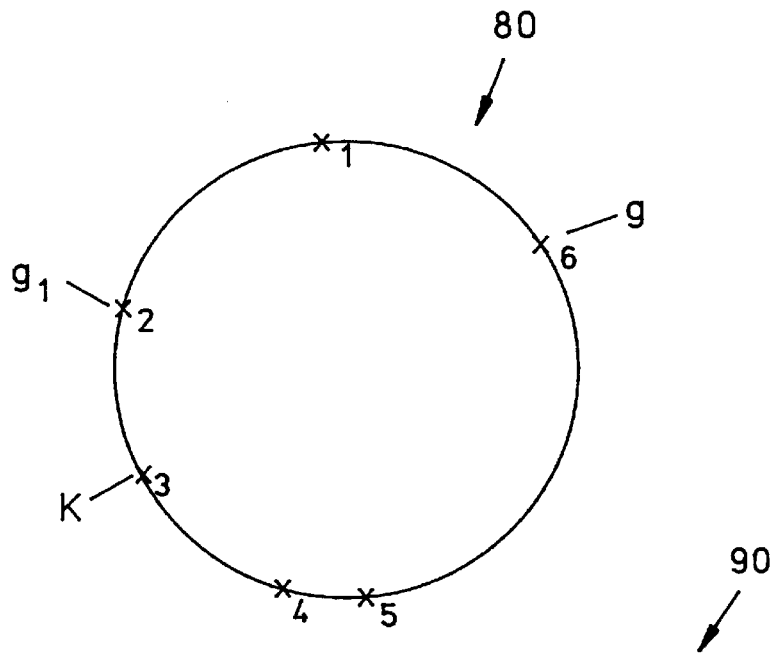
FIG. 5
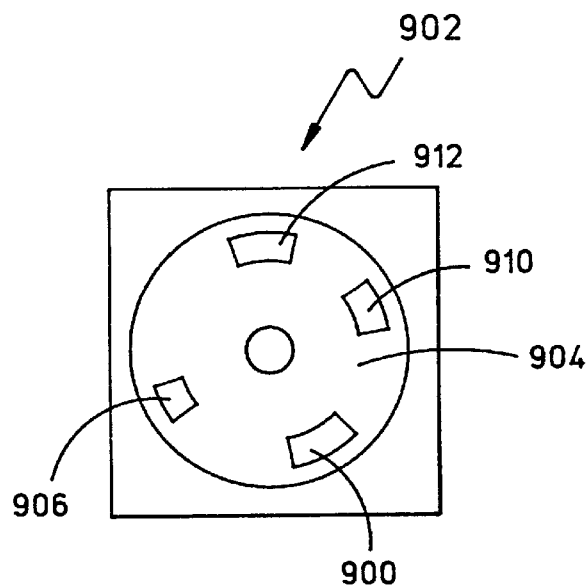
FIG. 6
FIG. 7

METHOD AND SYSTEM FOR PROTECTION OF DIGITAL INFORMATION

BACKGROUND OF THE INVENTION

1. Field of the Invention

This invention relates to digital information processing systems and methods, and more particularly to systems and methods to protect digital information.

2. Description of the Related Art

The advent of new means for storing and distributing digital information brings new security concerns and problems. Such new means include CD-ROMS used for mass mailings of software, the Internet and/or World Wide Web used for electronically distributing software and other digital information, and communication channels such as satellite or digital cable-TV for broadcasting information. These means enable selling digital content quite inexpensively, especially in comparison to conventional methods of distributing such content on physical media through retail outlets. For example, computer software is recorded on magnetic media and CD-ROM, then boxed and shrink-wrapped, digital music is recorded on CD's, and digital video is recorded on optical media. The various media must then be shipped to a store, or directly to the customer. In contrast, when a network is in place, as is the case, for example, with the Internet and cable TV networks, an information provider simply needs to store the information on a medium accessible to users of the networks. However, if digital information is made available through such inexpensive means as broadcasting, distribution over the different routes of the so-called "Information Superhighway" (e.g. the Internet), and mass mailings on CD-ROM, then there exists a problem with securing the information in such a way that it will only be available to those who have paid for the right to access it.

In a July 1995 article entitled "Intellectual Value" in *Wired*, a popular press computer publication, the author, Esther Dyson, advocates that digital content providers should realize that the Internet allows essentially "free" copying of such content and therefore such providers can make money only by providing services related to the content. However, such an arrangement may be unacceptable to producers of digital information such as software, music, and videos, because in many cases there simply isn't a related service to sell. This article is representative of a growing recognition that the Internet provides great opportunities to reach a vast market, yet makes it difficult for information providers to be compensated for the labor, time, and investment involved with making such digital information available. The present invention is directed toward a system and method for providing a technique for such compensation by protecting such information so that it is available for use only to those who have paid for the legitimate right to use it.

The security required in data communications is much greater when open networks, such as the Internet or cable TV, are being used. Where there is greater access to the network, the possibilities for illegal copying and distribution increase. An approach known in the art for providing security of digital information is to distribute the information in an encrypted form, only releasing the necessary decryption information, called a "key", to legitimate users, that is, those who have paid for the service. The first problem with this approach is that, if implemented without safeguards, there is nothing to prevent a user from sharing the key with illegitimate users. This problem is addressed by this invention.

A second problem is that there is nothing to prevent a sophisticated legitimate user from capturing the decrypted content and sharing that with illegitimate users. Indeed, barring tamper-proof hardware decryption, there is no solution to this second problem; at some point in the process, a legitimate user must have access to the decrypted information in order to use it. If she is sufficiently sophisticated to be able to capture it, then she will be able to redistribute it. It is anticipated that the quantity of information required to be distributed will deter such behavior. In other words, if an illegitimate user must distribute a complete CD-ROM of content there is no economic incentive to do so.

There is a need for a way to reveal the decryption key, or information for reconstructing this key, in such way that this information is not easily relayed to illegitimate users. In this regard, U.S. Pat. No. 4,200,770 to Hellman et al. discusses a problem that has become known as the "key distribution problem". In that problem, two parties wish to agree on a key to use for subsequent secret communication. Thus, a solution to that problem involves keeping the key secret where both parties have a common interest in doing so. The Hellman et al. patent does not discuss how to keep the key secret, or at least difficult to reconstruct, when a legitimate user has no incentive to do so and, indeed, may have an incentive to reveal the key. This is one problem addressed by this invention.

One could sidestep the key revelation process entirely by resorting to "public-key encryption" which is discussed in U.S. Pat. No. 4,405,829 by Rivest et al. To use such an approach, each legitimate user has a "public key", which can be used to encrypt information intended for that user. Thus, the encryption of a message is "publicly computable", meaning that no secret information is necessary to compute the encryption. It is a fundamental property of public-key cryptosystems that it is "computationally infeasible" to determine the decryption key or otherwise decrypt the information, even knowing the public key. "Computationally infeasible" means that the number of operations and time required to decrypt or determine the key makes it impossible to do so for all practical purposes. However, such an approach requires encrypting the content for each user anew, since each user must have an individual public key. This completely eliminates the economy of scale available with mass replication of data (for example, on CD-ROM, etc.), wherein one key can be used to unlock the content stored on all the disks.

A solution to the problem of having a single key for the content but making it difficult for users to share that key is found in U.S. Pat. No. 5,319,705 to Halter et al. This patent is hereby incorporated herein in its entirety by this reference. The '705 patent describes a system wherein each piece of digital content to be distributed is encrypted with a different encryption key before it is distributed. A user wishing to purchase a piece of content obtains the encrypted content from a source such as a widely-distributed CD-ROM. He then communicates with an authorization center to obtain a decryption key K to decrypt the content to make it usable. The authorization center does not tell him K directly because, as discussed above, this might tempt a user to share K with friends, or even to resell it for profit. Therefore, in response to a customer order for data such as software, the authorization center applies what we call an "authorization function" to a unique customer number supplied by the customer to produce a customer key. The customer key is used to encrypt the decryption key K. K is then used to unlock the encrypted file. The customer is discouraged from sharing his authorization because it comes as a pair, and the first half of the pair, his customer key, identifies him and/or would be difficult for other users to mimic.

The security of the system and method taught by the '705 patent depends on the authorization function remaining secret to the end user. Once the authorization function is known, then an adversary user may use the authorization function to act as a "pirate authenticator" who can profit by authorizing illegitimate users to unlock encrypted digital content. A problem with the system and method taught by the '705 patent is that the authorization function can be completely understood by carefully analyzing the "extrication function", that is, the calculation that is performed on the user's computer to extricate, or obtain, the decryption key.

Unfortunately, there have been many instances of modern-day pirates who use sophisticated knowledge and technology to break into seemingly secure computer systems. The inventors of the present invention have made the critical recognition that it is fruitless to try to hide an extrication function from such sophisticated hackers, because the software for performing the extrication function must reside on the user's processor and is therefore easily analyzed by the end user. What is needed is a system and/or method to secure digital content without requiring that the extrication function be kept secret from the end user, yet the extrication function must not be usable to determine the related authorization function that resides at the authorization center.

This suggests use of a digitally signed authorization provided by the authorization center to the end user which must be entered to access secure information. A digital signature has an advantage in that the calculation performed to verify a digital signature yields no practical information on how to forge or falsify such a signature. The problem with such an approach is that verifying digital signatures relies on the test of the condition that the authorization statement is correctly signed. Therefore, the code can be easily "patched", i.e., modified, so that the test is bypassed by a sophisticated user.

In theory, it is always possible for a user to implement some type of bypassing because the user's processor computes the decryption key K. Thus a hacker can capture K and redistribute it. That this is a problem is illustrated by the current situation with piracy of TV signals by rural satellite dishes. A pirate sells to an illegitimate user a patch to his receiver, which then enables the pirate to sell to the user the individual keys K to various TV and cable networks of interest. Similarly, in the case of extrication functions, a pirate can sell a patch to an illegitimate user that enables him to bypass the extrication function, and use the decryption key directly, and then can sell the illegitimate user keys to individual content. A method and/or system that provides a disincentive for such a patch would be an advance in the art.

As referenced in the art, an additional level of security is providing by making the key very long, since this deters a potential pirate because he cannot easily transmit the key to an illegitimate user.

The inventors have recognized that it would be a significant advance in the art to design a system that has an openly available and publicly computable extrication function, that is computationally infeasible to invert. The inventors have recognized that it would be a further advance to provide such a system with extremely long decryption keys and short communication from an authorization center.

SUMMARY OF THE INVENTION

To overcome the limitations in the prior art described above, and to overcome other limitations that will become apparent, this invention provides a method and system to distribute extrication functions to legitimate users of information that are (1) openly available, publicly computable, and computationally infeasible to invert; (2) use an extremely long decryption key; and (3) require only short communication from the authorization center.

In the method of this invention, an authorization center processor receives a user identifying signal value $n_i$, and then responsively creates a corresponding authorization signal $a_i$, called a "signet", since it shares some properties of a digital signature. The pair ($a_i$, $n_i$) is called a "signet pair". The extrication function operates on the signet pair to produce a key signal K that may be used to decrypt the digital information. The extrication function is publicly computable. However, it is computationally infeasible to determine how to create a new authorization signal $a_j$ for a corresponding user processor identifying signal value $n_j$, or even to create any new valid signet pair wherein a "valid signet pair" is any pair (x, y) in which x is the result obtained by applying the authorization function, or computation, to y. An alternative embodiment of this invention offers the feature that, although the signet pair is short, the key produced by the extrication function is long. The combination of having a long key K with the intractability of generating a new signet pair based on previous signet pairs and the extrication function, serves to demotivate (i.e. by use of a long K) and incapacitate (i.e. the feature of intractability) those who might wish to attempt to become illegitimate or pirate authorization centers. This invention further includes an environment in which the above-described method may be carried out.

BRIEF DESCRIPTION OF THE DRAWING

The objects, advantages and features of this invention will be more clearly understood by reference to the following detailed disclosure and the accompanying drawing in which:

FIG. 5 is a diagramatic representation of a use of sub-groups to enhance the operation of this invention shown in FIG. 4;

FIG. 6 is an example of an application of the operation of this invention shown in FIG. 4; and FIG. 7 is an article of manufacture, such as pre-recorded floppy disk, or other similar computer program product, for use with the information processing system of FIG. 1 with program means recorded thereon for directing the information processing system to facilitate the practice of the method of this invention as shown in the flow chart of FIG. 4.

DETAILED DESCRIPTION OF THE PREFERRED EMBODIMENTS

This invention is described with reference to a preferred embodiment, and in conjunction with the following drawing figures. In these figures, a like number shown in various figures represents the same or similar elements. While this invention is described in terms of the best mode for achieving this invention's objective, it will be appreciated by those skilled in the art that variations may be accomplished in view of the teachings without deviating from the spirit or scope of the invention. In particular, certain aspects of this invention are described as operating in terms of computer software and computer memory, but this invention could also be enabled in hardware by one skilled in the computer art in view of the teachings herein.

System Architecture

Figure 1:
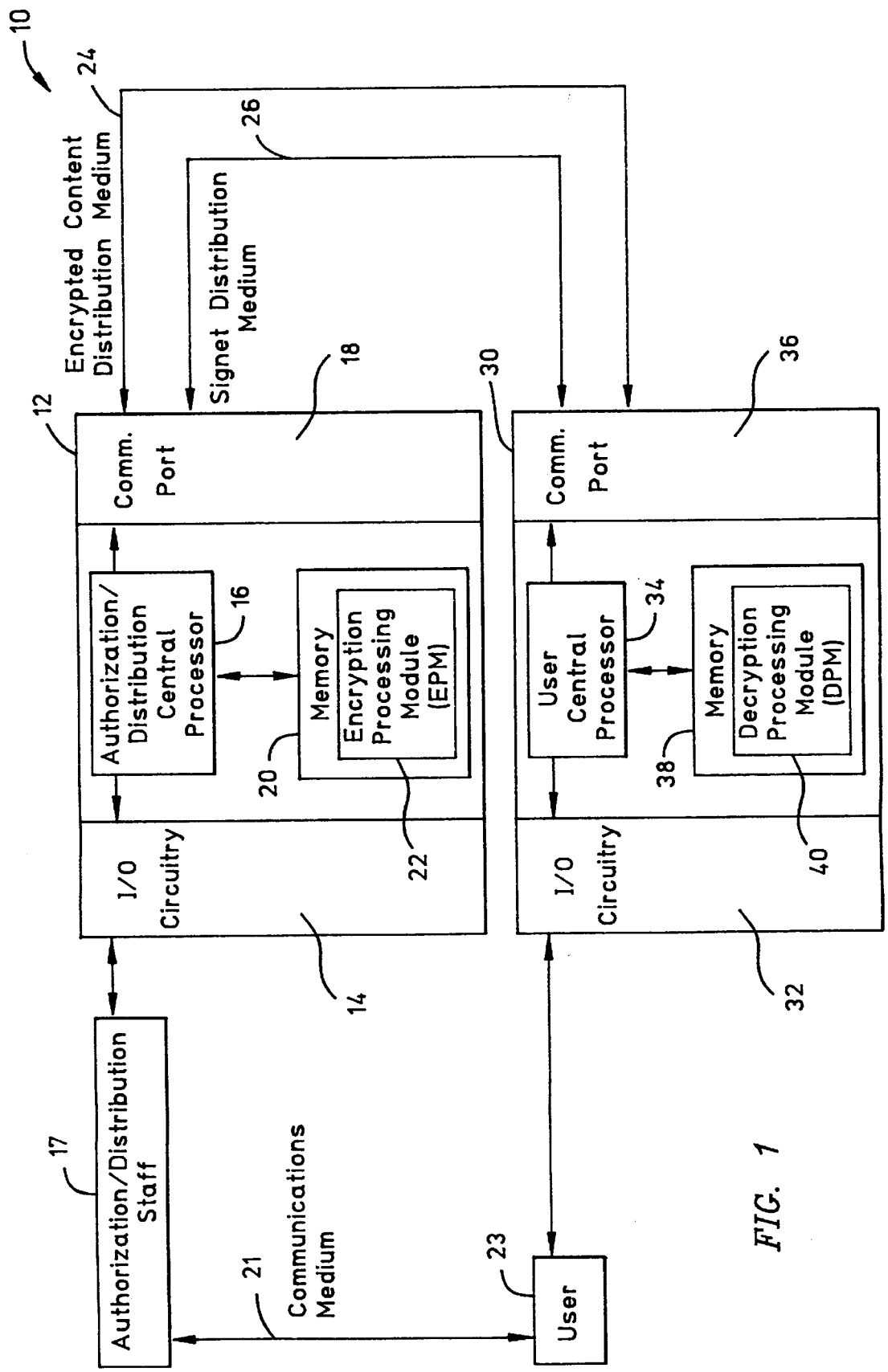
FIG. 1 is a functional block diagram of the digital information processing system of this invention.

FIG. 1 shows a preferred environment for the operation of this invention. Digital information processing system 10 is used for processing encrypted digital information communicated from an authorization center system 12 for decryption on user information processing system 30. The digital information is distributed as one or more encrypted files, each encrypted file using one or more keys that permit the encrypted information to be decrypted and recovered by the user information processing system. The encrypted content is distributed on distribution medium 24. Distribution medium 24 may include information storage means, such as a CD-ROM, but also may include communications channels and networks such as the Internet, the World Wide Web, digital cable TV, and satellite broadcasts. The invention is particularly applicable to those media which make the information available on a public basis. For example, it is clear that information posted on a bulletin board that is accessible to the Internet is public. Such public venues may also include mass mailings of CD-ROMs, for example, to potential customers whose names are selected from a target mailing list. Distribution medium 24 may also include any other public media currently available and even those presently not available.

Authorization staff personnel 17, who represent those individuals who are employed by or are other trusted agents of the legitimate owners of the information to be distributed communicate with an authorization center information processing system 12 through I/O circuitry 14. I/O circuitry 14 allows the staff to communicate with the authorization/ distribution central processor 16 to control encryption processing module 22 and memory 20. In a preferred embodiment, module 22 is loaded into memory for execution; however, it could reside separate from main memory as a separate portion of logic executable by the processor 16.

In a preferred embodiment, the authorization and distribution system is combined; however, it will be appreciated that, in view of the teachings herein, the functions of the authorization center and the distribution center could be split without deviating from the spirit and scope of this invention. Communications port or ports 18 controlled by the central processor 16 have a communication path to the encrypted content distribution medium. The medium could be a communications network or other communications channel accessed via such means as coaxial cable or fiber-optic lines. The port or ports also have a communication path to a signet distribution medium 26 which will be explained below. The authorization/distribution staff may communicate with the user information processing system 30 through the content distribution medium 24 and the signet distribution medium 26 through a communication port 36 on user information processing system 30. The authorization/distribution staff may also communicate through a communications medium 21 which may be, for example, a phone line allowing connection directly to a user 23. User 23 may communicate with the central processor 34 through I/O circuitry 32. User central processor 34 controls memory 38 and communications port 36. In a preferred embodiment, a decryption processing module 40 is loaded and run in memory 38, but the module could reside apart from main memory as a separate portion of logic executable by the processor 16.

Figure 2:
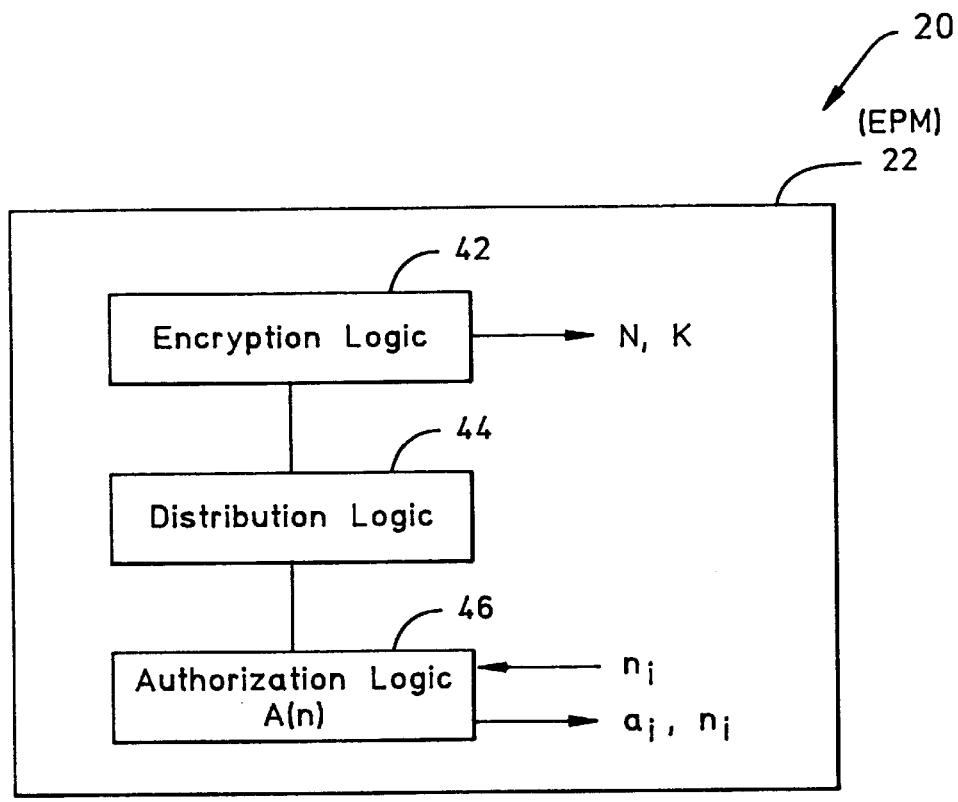
FIG. 2 is an encryption processing logic module useful in the information processing system of FIG. 1.

Referring to FIG. 2, encryption processing module 22 includes logic for carrying out the operation of this invention. The logic is described in terms of software; however, it will be appreciated by those skilled in the computer art that the logic could also be embodied in hardware, in view of these teachings. Encryption processing module 22 includes encryption logic 42, distribution logic 44, and authorization logic 46. The encryption logic 42 acts as a function generator by carrying out the function of encrypting the digital information in accordance with a particular embodiment of an encryption function, described in more detail below. The encryption logic encrypts the content in accordance with an extrication function chosen to run the decryption processing module 40 (FIGS. 1 and 3).

In a preferred embodiment, all of the extrication functions make use of "modular arithmetic", the well-known technique of performing arithmetic and then taking the remainder "mod N", which becomes the result. In particular, all the functions use an exponentiation modulo N procedure. Preferably, N is selected ahead of time by the authorization/ distribution staff and stored with the encrypted digital content. Also stored with the encrypted content is additional information that can be used, in combination with information provided by the authorization center, by the decryption processing module to extricate the decryption key K. Distribution logic 44 carries out the function of placing the content on a medium for communication to the user. Thus, distribution logic 44 could include logic which writes the encrypted information to a CD-ROM or could, for example, include logic which broadcasts the information over a communication channel or the Internet.

The encryption processing module 22 further includes authorization logic 46 which applies an authorization function to produce an authorization signal value $a_i$ in response to receiving a user identifying number $n_i$ to produce a digital signal pair ($a_i$, $n_i$). The digital signal pair is denoted as "a signet pair." The authorization logic 46 is housed on the authorization distribution center system 12 so that it is non-public and operates in a secure environment. The authorization logic 46 creates an authorization signal value $a_i$ for a given user signal value $n_i$, which can then be communicated to the user, either by telephone across communications medium 21 or electronically through the signet distribution medium 26. By securing the authorization function, the ability of an adversary to become a pirate authorization center is greatly decreased even though the decryption processing module 40 is publicly available since it resides on the user information processing system. Further, it will be appreciated in view of the teachings herein that, even though the decryption processing module 40 is publically available, this invention makes it infeasible for an adversary to become a pirate authorization center. The existence of a pirate authorization center is highly undesirable for the legitimate owner of digital information. This is because, unlike a single user who manages to decrypt information through reverse-engineering, a pirate authorization center could give other users illegitimate authorization numbers which then could be used in combination with valid user identification numbers to decrypt other encrypted content. This invention provides means for making it economically infeasible for a pirate authorization center to exist in competition with the legitimate owner of encrypted digital information.

Figure 3:
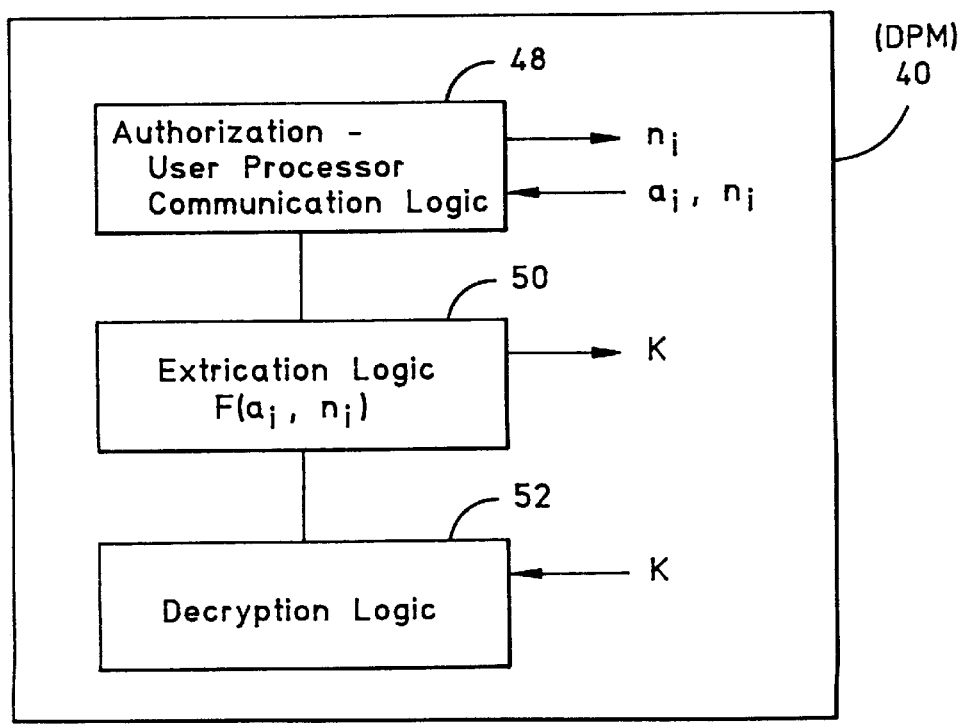
FIG. 3 is a decryption processing logic module useful in the information processing system of FIG. 1.

Referring to FIG. 3, the decryption processing module 40 is shown in the user information processing system memory 38. It will be appreciated that the processing module could also be completely embodied as hardware but preferably is embodied as software loaded into and adapted to change the configuration of memory 38. The processing module 40 includes communication logic 48 that is adapted to perform the function of communicating $n_i$ across the signet distribution medium 26 to the authorization distribution central processor 16 through communication port 18. However, it will be appreciated that the identifying signal value $n_i$ may also be communicated directly by the user 23 to the authorization/distribution step 17 through communication medium 21. The communication logic 48 is also adapted to receive the signet pair ($a_i$, $n_i$) from the authorization/distribution center system when the authorization function is performed by the authorization logic 46. The signet pair is used by the extrication logic 50 to apply an extrication function F to the pair to produce the decryption key K. The decryption key K is used by the decryption logic module 52 to produce decrypted information from the encrypted content.

Operation of the Invention

Figure 4:
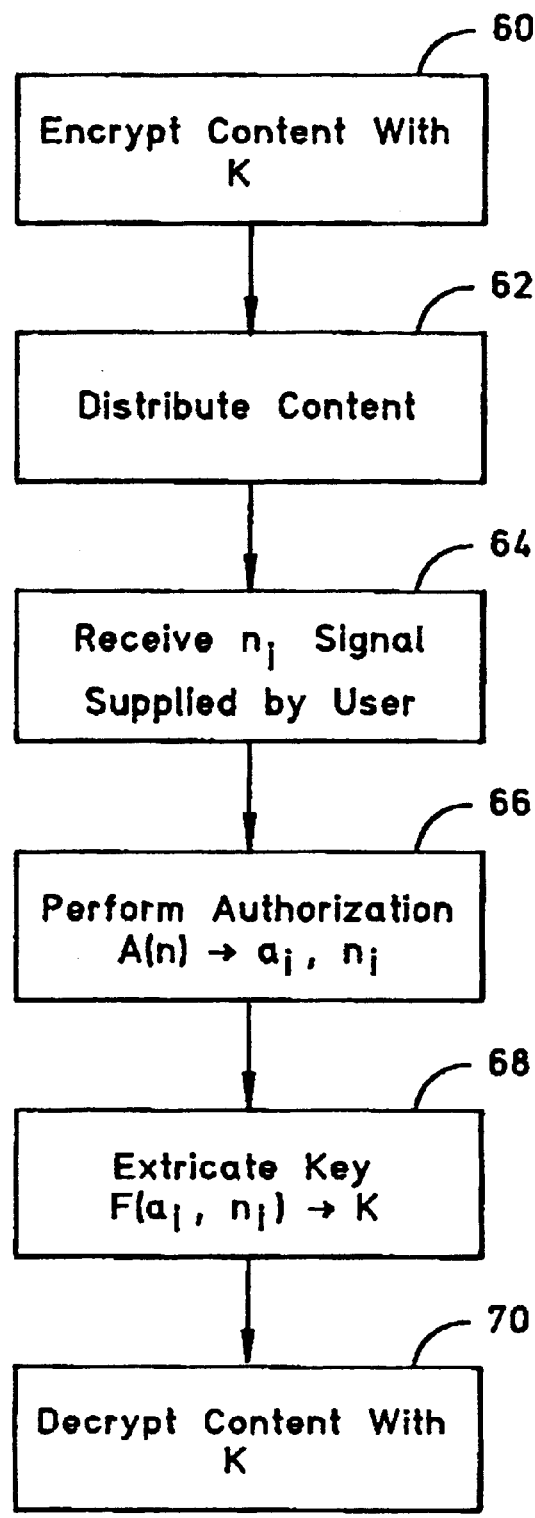
FIG. 4 is a flow diagram of the operation of the encryption processing logic module of FIG. 2 combined with the decryption logic module of FIG. 3 in the information processing system of FIG. 1.

An overview of the operation of the invention is shown in FIG. 4. In step 60, the digital information is encrypted. The content is then distributed, in step 62, through inexpensive means, such as mass mailings of CD-ROMs, distribution over the Internet and/or World Wide Web, and distribution by broadcast channels such as satellite or digital cable-TV. For each piece of content the authorization/distribution center wants to distribute, it picks the extrication function embodiment it desires to use, and picks N and K and possibly other values in accordance with that embodiment. The content is encrypted with K and broadly distributed to the user community, together with N, and whatever other values are required to be stored with the content as required by certain embodiments of the extrication function.

A user wishing to purchase the content retrieves the encrypted content from the distribution channel, such as distribution medium 24, then communicates with the authorization/distribution center providing his or her user number $n_i$, which may be, for example, his or her credit card number. Thus, the authorization/distribution center receives the signal "supplied" by the user. It should be appreciated by those skilled in the art that "supplied by the user" encompasses any form of communication by the users or even the users' information processing system. Such communication includes telephonic means, electronic means, and even manual means such as via a mail carrier. For brevity, "user processor" is used hereinafter to refer to a user's information processing system. The reception of the user number $n_i$ supplied by the identified user is shown in step 64. In step 66, the authorization center uses the encryption processing module 22 and in particular the authorization logic 46 to perform the authorization function for the particular embodiment yielding the authorization signal value $a_i$ and combines them to produce a signet pair ($a_i$, $n_i$). The signet pair is distributed across the signet distribution medium 26 to the user processor communication port 36 to the user central processor 34. Alternatively, the signet pair ($a_i$, $n_i$) could be combined by the decryption module upon receipt of $a_i$ from the authorization center and input the $n_i$ supplied by the user. The user central processor 34 passes the signet pair to the decryption processing module 40. The module executes the extrication function on the signet pair which yields the decryption key K, in step 68. In step 70, K is used by the decryption logic to decrypt the content by the user. The content is now freely available to the user, yet he cannot authorize others without also revealing his personal number $n_i$ or transmitting K. Therefore, in a preferred embodiment, "$n_i$" should be selected as a number that the user would not want to share, for example, his credit card, his phone number, social security number, or some other number having personal sensitivity. Further, "$n_i$" may also be a value that identifies the user processor in a unique way. The concept of a unique identifier for a user processor is known in the art and is referred to as a machine "thumbprint". It may be, for example, a location in fixed storage of a certain directory such as the sector on which critical files of an operating system are loaded or may be a unique identifier for machine BIOS. The combination of the machine thumbprint with a personally sensitive user number would further serve to make "$n_i$" very difficult for a user to share.

Recall that a primary objective of this invention is to prevent an adversarial or pirate authorization/distribution center. Thus, the invention prevents an adversary from authorizing arbitrary user processor identifying numbers $n_i$, or from finding a new signet pair ($a_j$, $n_j$) that would also work with the extrication function to produce the decryption key K. The invention also has an objective of preventing the adversary from making a trivial patch such as a "yes/no" branch in the extrication function to extricate K, or in the decryption logic to directly decrypt the content. It is a fundamental recognition of the inventors that the adversary is likely to be able to determine the decryption key K by using a debugger to stop the calculation at the point that K has been calculated. In such a case, the adversary could then distribute K to his clients together with a patch that enables a decryption module to use K directly instead of the signet pair it would otherwise expect. The fact that the code must be patched would discourage the pirate authorizer's potential customers who would probably be afraid of computer viruses. The inventors recognize that if K is made much longer than the authorization number $a_i$ then the adversary is burdened with the additional disadvantage that he cannot communicate K as easily as legitimate authorization centers can communicate $a_i$, and in particular, cannot read K over the phone for the user to type in. Moreover, if K is as long as the content itself, the adversary would probably prefer to distribute the unencrypted content itself, with all the expense and problems that entails. In other words, it would be so expensive that there would be no economic incentive to become such a pirate. It is a feature of this invention that K can be made arbitrarily long compared to the authorization signal value $a_i$. The arbitrarily long K, combined with the techniques described for making "$n_i$" a difficult number to communicate, enable this invention to minimize the chances of a signet pair or decryption key being made available to non-legitimate sources.

For the sake of simplicity, it is preferred that the encryption keys used be symmetric, i.e. the same key is used for both encryption and decryption; however, it will be understood by those skilled in the art that the invention is equally applicable to asymmetric encryption schemes since the extrication function merely extricates K without being concerned with what key was used for encryption.

The invention is further based on the inclusion of an extrication function that is "privileged clawfree". A function f is said to be privileged clawfree if, given x and y such that f(x)=y, it is computationally infeasible to find an x' different from x such that f(x')=y, without having some secret (privileged) information. This definition applies even if the x and x' are themselves pairs of numbers, as is the case in one embodiment of the current invention, where x is a signet pair and y is the key K. It is a fundamental assumption that the authorization center has the necessary privileged information, and so can generate many signet pairs x such that when the extrication function is applied to any such x it yields K. In response to receiving a user identifying signal $n_i$, the authorization center produces a signet $a_i$ such that, when the extrication function is applied to the signet pair ($a_i$, $n_i$), it yields K. Embodiments of privileged clawfree extrication functions are described below. However, it is novel and useful to use privileged clawfree functions as extrication functions to protect digital information. Thus, any such function used in accordance with the teachings herein will be appreciated to be within the spirit and scope of this invention.

Preferred Embodiments of Extrication Function

Version 1: According to this version, the authorization center picks an N which is a large number for which it knows the factors but which would be hard for anyone else to factor. For example, the authorization center can randomly choose two large prime numbers and let N be the result of multiplying them together. However, other methods of picking N will also work.

The authorization center also picks the key signal value K such that 1<K<N. The key signal value is also referred to as simply "key" or "K" for the sake of brevity.

When a user calls to obtain a digital signal pair, or signet, the authorization function logic running in the authorization processor proceeds in two steps. First, if $n_i$ is even, it is turned into an odd number $n'_i$, for example, by adding 1. The second step is to calculate $a_i = (K \oplus n_i)^{1/n'_i \mod \phi(N)} \mod N$, where $\phi(N)$ is Euler's $\phi$ function, a well-known function which can easily be calculated if the factors of N are known, and $\oplus$ denotes modulo-2 addition, also known as exclusive-OR.

It is possible that there may be no number that satisfies this formula; that is, there may be no number that, when multiplied by $n'_i$, yields 1 mod $\phi(N)$. In this case the authorization center cannot authorize the user's $n_i$. This happens whenever $n'_i$ is not relatively prime to $\phi(N)$. ("Relatively prime" means that the only integer that evenly divides N and $\phi(N)$ is 1.) $\phi(N)$ is always even (hence the first step of making $n'_i$ odd); however, N can be picked such that $\phi(N)$ has only large factors (other than 2), and thus the chance that the authorization center will not be able to authorize a user can be made vanishingly small in practice.

The extrication function executed at the user's computer has two steps. First, if $n_i$ is an even number it is turned into an odd number $n'_i$, in exactly the same way the authorization center does. Second, it calculates $K = (a_i^{n'_i} \mod N) \oplus n_i$.

An adversary cannot perform the authorization calculation because the factors of N are unknown to the adversary. The use of the exclusive-OR operation in the functions prevents an adversary from creating a different ($a_j$, $n_j$) pair from an obtained valid ($a_i$, $n_i$) pair. Without the exclusive-OR operation, for example, the pair ($a_i^3$, $n_i/3$) would work if ($a_i$, $n_i$) worked and the number $n_i$ was divisible by 3. Of course, $n_i/3$ might be a totally invalid user number (credit card) and thus fail other tests, but the performance cost of the exclusive-OR is negligible compared to the exponentiation so there is no down-side to including it in the calculation. It is understood by anyone skilled in the art that many other functions could take the place of the exclusive-OR in Version 1 and still provide this level of security: such other functions include, for example, addition, subtraction, and bit-wise rotation. All such functions should be considered within the scope of this invention, including the omission of that step entirely.

Version 1 is a great improvement over authorization functions currently found in the art because no amount of reverse-engineering can enable an adversary to become a new authorization agent. However, K is roughly the same size as $a_i$, which opens the door to the potential attacks discussed previously. The remaining versions of the extrication function do not suffer from this exposure.

Version 2: For this function and the following, it is necessary to introduce the idea of a resilience threshold t, i.e., the number of users who will have to get together and pool their signet pairs to break the scheme. The authorization center using the encryption processing module picks t and a very large N (for example, a million-bit number).

The encryption processing module searches for a random number g that is a generator of a somewhat large multiplicative subgroup R of $Z_N$ where $Z_N$ is the set of numbers less than and relatively prime to N. A generator of a multiplicative subgroup R of $Z_N$ is a number, the set of whose powers mod N consists of the whole subgroup R. The scope of this invention includes any method for finding such a g, including random occurrence. However, for completeness, a method for constructing N is described below for which there are many such generators, and for which a random generator can be found quickly and efficiently.

The authorization center then proceeds to pick random numbers k and $b_1, \ldots, b_t$ in the range [2: $|R|$] and relatively prime to $|R|$, where $|R|$ denotes the size of the subgroup. It then calculates the key $K = g^k \pmod{N}$. Also, for $1 \leq i \leq t$, $g_i = g^{b_i} \pmod{N}$ will be calculated and distributed with the content.

The authorization function calculates the signet $a_i = k - b_1 n_i - b_2 n_i^2 - \ldots - b_t n_i^t \mod |R|$.

The extrication function is $K = g^{a_i} g_1^{n_i} \ldots g_t^{n_i^t} \mod N$. (Note that this is $g^{k - b_1 n_i - b_2 n_i^2 - \ldots - b_t n_i^t} g^{b_1 n_i} \ldots g^{b_t n_i^t} = g^k$.) This function can be computed using only t+1 exponentiations as $g^{a_i}(g_1 \ldots (g_{t-1} (g_t)^{n_i})^{n_i} \ldots )^{n_i}$.

The security of this embodiment relies on the assumption that bi is intractable to find from its corresponding gi. However, if the adversary observes and records t+1 authorizations, he will have t+1 equations and t+1 unknowns and therefore will be able to find k and $b_1, \ldots, b_t$ by solving the equations simultaneously. It can be understood by anyone skilled in the art that it is possible to modify the authorization and extrication functions in many ways to achieve the same resilience threshold t. All such modifications are within the scope of this invention.

It is another fundamental assumption that the size of the subgroup R will determine the size of the signet; for example, the signet might be a 1000-bit number. R is large enough that it cannot be exhaustively searched. The key K, on the other hand, will be roughly of the same length as N, in this example, a million-bit number.

Referring to FIG. 5, the schematic circle 80 is a representation of the group $Z_N$. The subgroup R consists of the values corresponding to points $x_1$, $X_2$, $X_3$, $X_4$, $X_5$, and $x_6$.

For completeness, an example of one method of constructing N such that finding a generator g with suitable properties is described below.

For example, choose 1000 large (1000-bit) primes $p_1, \ldots, p_{1000}$, and let $N = p_1 p_2 \ldots p_{1000}$. The chosen primes, $p_1, \ldots, p_{1000}$, are not necessarily all distinct from each other. This makes N a 1,000,000 bit number, making $Z_N$ of size roughly $2^{1,000,000}$. These primes are of special form: each $p_i$ is such that $p_i - 1 = x \beta_i$, where x is a number with one or more large prime factors known to the designers of the function, as are the factors of $\beta_i$. For each $p_i$, randomly pick numbers and test if they are prime elements mod $p_i$. A "prime element" is a generator of the group $Z_{p_i}$, the set of positive integers less than and relatively prime to $p_i$, and methods for finding them are well-known in the art; see for example, Knuth, *The Art of Computer Programming*, Vol. 2. When a prime element $s_i$ is found, calculate $r_i=s_i^{\beta_i}$ mod $p_i$. Then combine all the $r_i$ into a single number using the well-known "Chinese Remainder Theorem" (see Knuth, ibid.). This number is a g that is guaranteed to be a generator of a subgroup mod N of size $\phi(x)$.

Version 3: This embodiment is a variant of Version 2 that gives the same security level as Version 2, i.e., it can tolerate t dishonest users at a small increase in space but a significant decrease in computation costs.

Let s be an additional security parameter (which can be as small as 3). Store, for example, on a CD-ROM, generators $g_1, \ldots g_{2t}$, wherein each $g_j=g^{b_j}$ for some $b_j$ relatively prime to $|R|$. The authorization function is computed as follows. On input n, the authorization function chooses uniformly at random s indices $i_1, \ldots, i_s$, $1 \le i_j \le m$, where $m=2t$. The signet is $a_i=(k-b_{i_1}n_i- \ldots -b_{i_s}n_i^s)$ (mod $|R|$) together with the ordered list $i_1, \ldots, i_s$.

The extrication function E uses the ordered list of indices to choose generators and computes $g^{a_i}g_{i_1}^{n_i} \ldots g_{i_s}^{n_i^s}$. The advantage of Version 3 over Version 2 is that the user's program performs s+1 exponentiations while still maintaining a resilience of t. Each new signet pair observed by the adversary adds a new equation to a system of equations that must be solved to solve the function. The extrication function remains clawfree until an adversary has amassed a collection of k equations with no more than k unknowns. It can be shown that this happens with extremely low probability until the number of observed authorizations approaches t.

Version 4: This is a variation on Version 3. This approach gives the same security level as Version 3, i.e., it can tolerate t dishonest users at an increase in space.

Let s be a parameter as in Version 3, and let $m=m(s,t)$ (m is chosen slightly differently than in Version 3; s evenly divides m). Store, for example, on a CD-ROM m+1 generators g, $g_1, \ldots, g_m$, where each $g_j=g^{b_j}$ for some $b_j$ relatively prime to $|R|$. The generators $g_1, \ldots, g_m$ are partitioned into m/s pairwise disjoint sets, $S_1, \ldots, S_{m/s}$. The authorization function is computed as follows. On input of $n_i$, the authorization center chooses uniformly at random one of the sets $S_j$ by choosing a random j in the range [1:m/s]. Let the generators in $S_j$ be denoted $g_{j1}, \ldots, g_{js}$, and let the b's by which these were defined be, respectively, $b_{j1}, \ldots, b_{js}$. The signet is $a_i=k-b_{j1}n_i-b_{js}n_i^s$ together with the index j.

The extrication function E uses j to choose generators and computes $g^{a_i}g_{j1}^{n_i} \ldots g_{js}^{n_i^s}$.

Chinese remainder arithmetic is a fast method of doing high-precision integer calculations well-known in the art. An advantage of Chinese remainder arithmetic is that the Chinese remainders never need to be combined into a single number. Thus, the remainders themselves can be used as the key K. This is important because combining remainders is an expensive operation to perform on a computer. For increased security it may be better to keep the factorization of N secret; however, in the case when the factorization is known it is preferred to use Chinese remainder arithmetic.
Best Mode for Minimizing Damage With the exception of Version 1, once an adversary has collected enough valid signet pairs, i.e. enough to pass the resilience threshold, the adversary can act as a pirate authorization center. In Version 1, no amount of collusion between adversaries would enable this. Moreover, in all of Versions 1 through 4, there is a risk that an adversary may choose to reveal his signet pair ($a_i$, $n_i$), perhaps as a means of "attacking" a disliked information provider. Various means can be adopted to prevent or minimize these problems.

The simplest technique to minimize damage is for the software company to change the decryption key K periodically. The protection provided by a frequent change must be balanced against the inconvenience and cost of doing so. Since a particular revelation or act of piracy only affects software encoded with that key, this approach should suffice in many cases.

Another simple technique is to make sure that the authorization center can only be reached through a means which has the capability to identify the phone number of the calling party. The phone number from which the authorization was requested is recorded with each authorization, which should act to discourage users who intend to disavow their credit card after obtaining a legitimate authorization.

An approach that prevents the problem of the user revealing his signet key is to have the number n that the user sends to the authorization center include information about the machine that the software will run on, such as a BIOS serial number. Such information uniquely identifies a processing system and is known in the art as a machine "thumbprint." Then the extrication function can check that it is being run on the appropriate machine before extricating the decryption key. This means that, as well as revealing his signet key, an adversary that wanted to harm the software company would have to provide a "patch" to enable another use to substitute his machine's serial number into the code. Of course such a "patch" would be undesirable because of the inherent risk of introducing computer viruses.

Finally, there is a technique to minimize the damage caused by an adversary that has been able to compute the authorization center's authorization function by gathering t signet pairs, which is equally applicable to Versions 2 through 4, although the risk of this occurring is rendered very low by this invention.

Once the authorization function has calculated the signet $a_i$, it does not send it directly but instead sends what we call a signet precursor $A_n$. $A_n$ is of the form $f^{-1}(a_i)$, where $f$ is a "trapdoor function"; that is, one that is easy to compute, but computationally infeasible to invert without privileged trapdoor information. The extrication applies $f$ to $A_n$ in order to obtain $a_i$, and then the rest of the operation is as described above with reference to Versions 2, 3 or 4.

As a specific example, the function $f$ can be $f(x)=x^r$ mod M, where M is the product of two large primes, such that M is slightly larger than the largest $a_i$ that the system is designed to accept, and r is relatively prime to $\phi(M)$. Choosing r to be small (for example, 3) is useful because it reduces the length of the calculation at the user's computer. M and r would be stored with the content. The factorization of M is a secret known only to the authorization center, so only the authorization center can compute $f^{-1}(a_i)=a_{a_i}^{1/r}$ mod M; however, an adversary cannot. The signet precursor is now $f^{-1}(a_i)$.

Even if the adversary has observed enough legitimate authorizations to be able to calculate $a_n$, the adversary cannot become a pirate authorizing center because she cannot calculate the signet precursor $A_n$ needed by the user's program. The worst that the adversary can do is to provide a patch that will allow a short key to be used instead of the long key K. M is small and the $f$ calculation quick compared to storage and calculation of the rest of the versions.

Referring to FIG. 6, an example of the use of digital signals in a user application is shown. The following is but one example of an application of the use of the digital signals or signets enabled by this invention and is illustrated for the purposes of illustrating ways to use this invention. FIG. 6 shows the contents of a hypothetical file that may exist in an operating system directory and may be named, for example, "signets.ini." The contents 90 are shown including a user processor identification number shown in field 92, a user identification field 94 and several identification fields for digital content which has been made available by the authorization/distribution center system 12. For example, fields 96, 98, 100, 102, and 104 show, respectively, that the following digital content has been downloaded by the user: movie title 1, movie title 2, music selection, computer game, and desk reference. Valid authorization numbers created by authorization logic 46 each corresponding to the valid user number shown in field 92 are shown respectively in fields 106, 108, 110, 112, and 114. It will be appreciated that, in a preferred embodiment, the authorization numbers are small enough to be easily read to a user 23 over the telephone so that he could pair his number $n_i$ such as the identification number shown in field 92, "9867-5432-1234-5678". Thus, one signet pair that could be used to open the content movie title 1 would be, for example, (4QQJ71NNWD, 9867-5432-1234-5678). This signet pair, when operated on by the extrication function, would yield a decryption key K that could be used to allow the user to use decryption logic 52 to unlock "movie title 1", for example.

It is envisioned that such an exemplary "signets.ini" file would be invoked and manipulated by logic such as described below in Table 1. Table 1 shows example logic "SIGNETS.DLL". It is assumed that the digital content is stored with integer g, g[1:t], and N. Further, in the following example pseudo-code "integer" refers to an unlimited precision (i.e. any number of bits) element in precision multiplication. On most computers, integers cannot exceed the word size of the machine, e.g. 32 bits. The "*" operator in the code below is a subroutine implementing the extended precision multiplication. Implementing extended precision arithmetic is well known in the art. See, for example, Knuth, *Art of Computer Programming*, Vol. 2. Following the C programming convention, the symbol % is used to denote the operation of taking the remainder. That is, A%B is the remainder of A after it has been divided by B. The "%" operation in this example is likewise an unlimited precision operation.

TABLE 1

```
/ * SIGNETS.DLL * /
procedure: UNLOCK (parameter: string name_of_content)
    integer n, integer a;
    let n = first part of SIGNETS.INI
    search SIGNETS.INI for name_of_content
    if not found then
        prompt the user:
            "do you wish to purchase 'name_of_content'?"
        if no then return; / * without unlocking * /
        / * user may type in 'a' obtained over the phone, or
                'a' can be transmitted via modem or net connection * /
        write name_of_content, a at end of SIGNETS.INI;
    else * / found record for name_of_content * /
        let a = remainder of record;
    end if
    / * now unlock the content with (a,n) : * /
    let K = 1;
    for i=1 to t
        let K = POWERMOD ((K * g[i]) % N, n, N);
    end for
```

TABLE 1-continued

```
    let K = (K * POWERMOD (g, a, N) ) % N;
    decrypt the actual content with K;
end procedure
```

The above example demonstrates logic embodied as the program SIGNETS.DLL searching the signets.ini file for "n" and for content desired to be unlocked. "a" is computed by the authorization function, given n and returned to the user processor. Then K is calculated using an exponentiation modulo N function with the generator g, authorization signal value a, user processor identification signal value n, and N. Once K is obtained the content may be decrypted.

Table 2 shows an example subroutine denoted as "POW-ERMOD". POWERMOD (x, y, N) performs the operation of taking x to the y power modulo N. Methods to do this are well known in the art, for example, by "successive squaring".

TABLE 2

```
procedure POWERMOD (parameters: integer x, integer y, integer N)
    returns integer r;
    let r = 1;
    while y > 0 do
        if y is odd then
            let r = (r * x) % N;
        end if
        let x = (x * x) % N
        y = y / 2; / * or shift y right by 1 bit, dropping low bit * /
    end while
end procedure
```

While this invention is primarily discussed as a method it can be understood by a person of ordinary skill in the art that the apparatus discussed above in connection with FIGS. 1, 2 and 3 may be programmed or otherwise designed to facilitate the practice of the method of this invention. Also, an article of manufacture such as a pre-recorded floppy disk shown in FIG. 7, or other similar computer program product for use with an information processing system, such as the information processing system of FIG. 1, include one or more storage mediums such as magnetic storage medium 904 and program means recorded thereon, such as program means 906, 908, 910 and 912 shown in FIG. 7, for directing the information processing system to facilitate the practice of the method of this invention. It will be understood that such apparatus and articles of manufacture also fall in the spirit and scope of this invention.

Other embodiments and modifications of this invention may occur to those of ordinary skill in the art in view of these teachings. Therefore, this invention is limited only by the following claims, which include all such embodiments and modifications when viewed in conjunction with the above specification and accompanying drawing.

What is claimed is:

1. In a digital information processing system having encrypted digital information distributed to a plurality of users for being processed on a plurality of user processors, a method for extricating at a user processor a decryption key K for decrypting the encrypted digital information, the method comprising the machine-executed steps of:

selecting at a non-public authorization center a number N and a decryption key value K, such that 1<K<N;

receiving at the authorization center a value $n_i$ supplied by a user;

responsive to receiving $n_i$, generating $n_i'$, an odd number, from $n_i$, and creating a corresponding authorization signet $a_i$ at the authorization center such that $a^i=(K \oplus n_i)^{1/n_i' \bmod \phi(N)} \bmod N$, where $\phi(N)$ is Euler's $\phi$ function, the authorization signet $a_i$ having properties of a digital signature;

communicating to the user a signet pair $(a_i, n_i)$; and applying at the user processor a publicly computable and privileged clawfree extrication function to $(a_i, n_i)$ and extricating K for decrypting the encrypted digital information, the extrication function being $K=(a_i^{n_i'} \bmod N) \oplus n_i$.

2. The method of claim 1, wherein K has an information length that is substantially as large as the encrypted digital information.

3. The method of claim 1, wherein $n_i$ identifies a personally sensitive number for the user.

4. The method of claim 1, wherein $n_i$ includes a credit card number.

5. The method of claim 1, wherein $n_i$ represents a machine thumbprint.

6. The method of claim 1, wherein $n_i$ represents a combination of a first value representing a machine thumbprint and a second value identifying a personally sensitive number for the user.

7. A digital information processing system for extricating a decryption key K, wherein K is used for decrypting digital information that has been encrypted, the system comprising:

a distribution processor;

an encryption module in the distribution processor;

a user processor in communication with the distribution processor;

a decryption module in the user processor;

the encryption module having means for:
encrypting digital information with a decryption key K wherein, with respect to a value N, $1<K<N$;
distributing the encrypted digital information to the user processor;
producing an authorization signal denoted as signet $a_i$ in response to a value $n_i$ supplied by a user such that $a_i=(K \oplus n_i)^{1/n_i' \bmod \phi(N)} \bmod N$, where $\phi(N)$ is Euler's $\phi$ function, where $n_i'$ is an odd number generated from $n_i$;
sending $a_i$ to the user processor; and
the decryption module including a publicly computable and privileged clawfree extrication function for extricating the decryption key K from the signet pair $(a_i, n_i)$, the extrication function given by $K=(a_i^{n_i'} \bmod N) \phi n_i$.

8. The system of claim 7, wherein K has an information length that is substantially as large as the encrypted digital information.

9. The system of claim 8, wherein $n_i$ identifies a personally sensitive number for the user.

10. The system of claim 8, wherein $n_i$ represents a machine thumbprint that uniquely identifies a physical characteristic of the user processor.

11. The system of claim 8, wherein $n_i$ represents a combination of a first value representing a machine thumbprint that uniquely identifies a physical characteristic of the user processor, and a second value identifying a personally sensitive number for the user.

12. A system for extricating a decryption key K, wherein K is used for decrypting digital information that is encrypted, and, wherein with respect to a number $N, 1<K<N$, the system comprising:

an encryption processor;

a decryption processor;

the encryption processor including:
encryption logic adapted to encrypt digital information with the decryption key K;
distribution logic adapted to place the encrypted information in a form capable of being distributed to the decryption processor; and
authorization logic adapted to respond to reception of a value $n_i$ identifying the decryption processor by creating an authorization value $a_i$, where $a^i=(K \oplus n_i)^{1/n_i' \bmod \phi(N)} \bmod N$, where $\phi(N)$ is Euler's $\phi$ function and $n_i'$ is an odd number generated from $n_i$, and the authorization logic further adapted to send $a_i$ to the decryption processor; and the decryption processor including:
communication logic for receiving $a_i$; and
extrication logic for performing a publicly computable, clawfree extrication function on a combined digital signal pair formed by the combination of $(a_i, n_i)$ to and extricating a decryption key K that is used for decrypting the encrypted digital information, the extrication function given by $K=(a_i^{n_i'} \bmod N) \oplus n_i$.

13. The system of claim 12, wherein the decryption processor includes decryption logic adapted to decrypt the encrypted information with K.

* * * * *